(12) United States Patent
Gent

(10) Patent No.: US 6,264,400 B1
(45) Date of Patent: Jul. 24, 2001

(54) DISPENSER FOR MATERIAL ON A ROLL

(76) Inventor: Keith A. Gent, Edgefield Hall Farm, Edgefield Melton Constable, Norfolk (GB), NR24 2RS ( * ) Notice: Subject to any disclaimer, the term of this patent is extended or adjusted under 35 U.S.C. 154(b) by 0 days.

(21) Appl. No.: 09/247,852

(22) Filed: Feb. 11, 1999

(30) Foreign Application Priority Data

May 8, 1998 (GB) .................................................. 9809698
Sep. 30, 1998 (GB) .................................................. 9821096

(51) Int. Cl.⁷ ...................................................... B09B 1/00
(52) U.S. Cl. ...................................... 405/129.75; 405/270
(58) Field of Search ............................ 405/129, 50, 270, 405/128; 172/439, 446, 19, 20, 5, 442, 445.2, 199; 414/24.6, 911, 920; 242/403, 557, 918, 919, 578.2, 399.1, 598.4, 563.2

(56) References Cited

U.S. PATENT DOCUMENTS

| | | | |
|---|---|---|---|
| 473,009 | * 4/1892 | Lyon | 405/270 |
| 1,610,753 | * 12/1926 | Davis et al. | 414/911 X |
| 2,393,655 | * 1/1946 | Robeck | 280/762 |
| 3,056,458 | * 10/1962 | Gray | 172/439 X |
| 3,301,498 | * 1/1967 | Greding | 242/598.4 |
| 3,908,846 | * 9/1975 | Brummitt | 414/24.5 |
| 4,025,006 | * 5/1977 | Turnbow | 414/24.6 |
| 4,060,254 | * 11/1977 | Ernst | 172/446 |
| 4,315,700 | * 2/1982 | Heiligtag et al. | 172/439 X |
| 4,720,212 | * 1/1988 | Steenbergen et al. | 405/50 X |
| 4,828,432 | * 5/1989 | Ives | 405/270 |
| 5,181,572 | * 1/1993 | Andersen et al. | 172/5 X |
| 5,304,014 | * 4/1994 | Slutz | 405/129 |
| 5,346,565 | * 9/1994 | White | 405/129 X |
| 5,536,116 | * 7/1996 | Lammers et al. | 405/129 |
| 5,685,668 | * 11/1997 | Justice | 405/270 X |
| 5,743,484 | * 4/1998 | Baskett | 242/557 |
| 5,794,883 | * 8/1998 | MacEwen | 242/423.2 |

* cited by examiner

*Primary Examiner*—David Bagnell
*Assistant Examiner*—Sunil Singh
(74) *Attorney, Agent, or Firm*—Elman & Associates

(57) ABSTRACT

The disposal of rubbish (trash, garbage), and other waste materials, is nowadays effected in a properly-designed tip (dump) so constructed and lined that none of its contents can in any way affect the ambient conditions. The required impervious lining layer comes in rolls, each of which is a long, heavy, sheet of material. The dispenser apparatus can be "rigidly" attached to a tractor's (conventional) three-point mounting. A long beam 34, or framework of beams, having roughly centrally thereof a three-point mounting 39 by which it can be attached behind a tractor 32 clear of the ground, the beam 34 having normally-disposed end plates 35 between which there is borne a support rod 26 carrying a roll 27 of liner material. Preferably the beam 34 is associated with positioning control device 62,63 that can be used to adjust the lateral angle of the lower three-point mounting linkages 61, and so move the roll 27 to either side to modify where the liner is laid.

10 Claims, 3 Drawing Sheets

DISPENSER FOR MATERIAL ON A ROLL

FIELD OF THE INVENTION

This invention is concerned with dispensers, and relates in particular to tractor-drawn dispensers suitable for use with rolls of sheet material such as that GCL sheeting used in the lining or capping of tips, reservoirs, contaminated land and the like.

BACKGROUND

The disposal of rubbish (trash, garbage), and other waste materials, is a problem that has concerned mankind for centuries, and that worsens with each year as populations and the sheer amount of waste increase. It has long been the practice to transport all rubbish to, and dump it at, some central site, and at the present time there are, adjacent most large towns, such dumps—or "tips"—specially designated for this purpose.

In earlier years a tip was merely an open area of ground onto which waste could be deposited, or at the very most a natural depression that could be filled up with the refuse. Later, though, much use was made of artificial pits such as result from the excavation of sand, gravel, clay, and other natural raw materials, while these days it is often necessary to construct a pit specifically for the purpose. And as dumps evolve, so the rules and regulations governing their use become more strict and more complex, in an effort to prevent their causing more problems than they solve. Specifically, it has become a regulatory requirement that every refuse pit be so constructed that none of its contents—and none of any materials that might arise from its contents—can in any way affect the ambient conditions. In particular, every pit must be so lined that nothing can seep down, into the underlying ground, and so pollute the surroundings—and especially the local water table and supply. Moreover, once the pit is full, and before earth can be laid on top and the whole landscaped, it is necessary to seal off the top as well.

A modern pit, which can vary in size from 25,000 sq.m (2.5 hectares, or about 6.25 acre) for a small pit up to 80,000 sq.m (8 ha, or about 20 acre) and beyond for a larger one—the latter are usually made up of a number of smaller pits, or "cells"—must be constructed to a set of very tight rules, and so far as leakage or seepage are concerned these relate to how the pit is lined.

Without going into too much detail, an earth pit must first have a compacted surface on top of which is a compacted sand layer with a flat and smooth surface (with no projections or indentations more that an inch—25 mm—high or deep). Then, on top of the sand, there must be laid an impervious lining layer—such as that known as a geosynthetic clay liner, or GCL. Such a liner is, in essence, a sandwich of bentonite clay between two layers of heavy-duty synthetic resin fabric (which may be either in film or in woven form). Typical examples of such liners are those made by Colloid Environmental Technologies Co. (CETCO), of Illinois, and available under the registered trademarks BENTOMAT and CLAYMAX, which cost around $5.00 per square meter. They come in rolls, each of which is a ribbon-like sheet of material (known, when deployed, as a "panel") from 3.5–5 m (12–16.5 ft) wide, from 40–45 m (135–150 ft) long, and about 10–11 mm (0.4–0.45 in) thick, and weighs, depending on the material, anywhere from 1000–1450 kg (about 2,200–3,200 lb, or about a ton to a ton and a half). These are laid directly onto the ground formation surface with an overlap—normally of around 15–22.5 mm (6–9 in), but in any case as required by the local authorities. Ignoring the overlap, it can be seen that the cost in materials alone of lining a large pit will be over $400,000.00, with another $400,000.00 or so for subsequently capping it—sealing it off once it's full. Getting the overlap right so that it is large enough to form a satisfactory seal but not so large as to waste significant amounts of material can save quite a lot of money.

The laying is commonly accomplished by the simple but effective means of threading the roll onto a support rod, attaching the rod by chains at each end to a rigid beam, mounting the beam (again with chains) to the bucket of a JCB—or a tracked 360 excavator, which is preferred if the ground is not to be churned up—and then carrying the roll along, letting the sheet liner pay out.

Unfortunately this method, though uncomplicated, is not especially accurate. Under windy conditions the unrolling liner can billow back and forth. Additionally, the chains that support the roll on the beam, and the beam on the bucket, allow the roll to swing from side to side, and it is all too easy to lay the liner such that the overlap is either too large or too small (so that there may even be a gap). Moreover, unless the roll is somehow braked, it can easily spin off excess material to form a heap.

SUMMARY OF THE INVENTION

The present invention seeks to solve these problems by providing a novel form of dispenser apparatus that can be "rigidly" attached to a tractor's (conventional) three-point mounting—a single, upper, pivot mounting that can be raised or lowered by the tractor's normal hydraulic system so as similarly to raise or lower whatever the mounting is carrying, and a pair of laterally-separated lower "floating" rigid link arms pivotally attached at their inboard ends to the tractor for slight sideways movement—and that can, optionally, be associated with "steering" means by which the roll can be shifted laterally from side to side so as to enable some small adjustment of the liner's laying position, and thus of the overlap between the sheet being laid and one previously laid.

More specifically, the invention proposes a long beam, or framework of beams, having roughly centrally thereof a three-point mounting by which it can be attached behind a tractor clear of the ground, the beam having normally-disposed end plates between which there may be borne a support rod carrying a roll of liner material. In the preferred case the beam is associated with positioning control means that can be used to adjust the lateral angle of the lower three-point mounting linkages, and so move the roll to either side to modify where the liner is laid.

In one aspect, therefore, this invention provides a tractor-mountable dispenser for a roll of material such as a geosynthetic clay liner, the dispenser comprising an elongate beam, or framework of beams, having roughly centrally thereof a three-point mounting by which it can be attached to the tractor so as to extend laterally therebehind, the beam carrying at either end a plate having rod-mounting means such that there may in use be borne between the end plates a support rod carrying the roll of material.

It is particularly preferred if the beam be associated with positioning control means that in operation can be used to effect adjustment of the lateral angle of the lower linkages of the three-point mounting, and thus move the roll to one side or the other to modify where, in use, the liner is laid.

Although for the most part herein the invention is discussed in relation to the lining or capping of a tip for trash, refuse and the like, it may in fact also be of use in the lining of other container-like holes in the ground. For example, modern water reservoirs need to be lined to stop their contents from leaking away, and the dispenser of the invention can be used to lay such a lining. Again, in some countries it may be desirable to store crude oil in giant pits, or perhaps to place surface storage tanks in safety pits to contain any leakage, and obviously it is extremely important to ensure that the pits are sufficiently well lined and/or capped to prevent oil from seeping into the surroundings.

The invention provides a tractor-mountable dispenser. The tractor employed to carry the dispenser may be of any type—a suitably-shod conventional agricultural tractor or loading shovel, for example, or a tracked crawler of some sort—provided, of course, that it has a suitable three-point mounting. As noted above, such a conventional three-point mounting comprises a single, upper, pivot mounting with an adjustable-length link and a pair of laterally-separated lower rigid link arms pivotally attached at their inboard ends to the tractor both for vertical movement and for slight sideways movement, which lower arms can be raised or lowered by the tractor's normal hydraulic system so as to raise or lower whatever the mounting is carrying.

It is normal for the sideways movement to be restricted by a chain on the outside of each lower arm; as is discussed further hereinafter, in the employment of the preferred forms of the dispenser of the invention these chains are removed, one of them being replaced by a hydraulic ram that can be used to drive the arm, and thus the dispenser, from side to side.

Bearing in mind the regulations regarding the smoothness of a tip's underlying surface, one important point about the tractor to note here is that it must be equipped with tires, or other ground-contacting drive and support means (such as tracks), that do not leave significant marks or indentations in the ground formation surface of the tip. For the most part, standard low-flotation tires as are commonly used on tractors on soft, boggy ground, and preferably with a tread not more than about 5 mm (0.25 in) deep, are perfectly satisfactory.

The invention's dispenser is for dispensing a roll of material such as a geosynthetic clay liner (GCL), or whatever is appropriate to the particular task at hand, and naturally, the roll may be of any suitable size. In the case of GCLs, those BENTOMAT and CLAYMAX materials mentioned hereinbefore are typical examples.

The dispenser of the invention comprises an elongate beam assembly (that is, a single beam or a beam framework), having a three-point mounting and carrying at either end a plate such that there may be borne between the end plates a support rod carrying a roll of material Although the dispenser could have only a single beam—it is quite possible to provide such a beam made of square-section mild steel tube, say, and strong enough to carry the roll and rigid enough to allow satisfactory distribution therefrom—it is much more convenient to construct the dispenser as a framework of beams, and typically as part of a "box" framework wherein the end plates form two opposed (side) faces of the box and the top surface of the box is defined by a pair of spaced parallel beams suitably elongated to provide the length appropriate for the chosen roll and perhaps with one or more bracing cross strut. For use with a roll 4 m long and 0.5 m diameter (about 13.5 ft by 1.75 ft) long such a framework might be 4.2 m long and 0.75 m wide and deep (about 14 ft by 2.5 ft by 2.5 ft). The individual beams making up the framework are conveniently square-section mild steel tube around 100×100 mm and 10 mm thick (about 4×4 in, 0.5 in thick), suitably welded to the end plates, which are themselves 10 mm (0.5 in) mild steel plate.

Hereinafter, and unless the context clearly indicates otherwise, the term "beam assembly" is used both to mean a single beam and to mean the beam part of a framework.

Because rolls come in different widths, depending on their precise purpose and cost, it is desirable to arrange for the width of the dispenser—the length of the beam assembly— to be adjustable so that it can more easily and efficiently cater for the several different rolls. To this end the beam assembly—or each individual beam making up the length of the framework—is "telescopic," it comprising a hollow, tubular main beam having slidably mounted therewithin at each end small (short) end beam portions that can be moved in or out of the main beam and then fixed in place, so as to alter the overall length of the whole beam. If the outer, main beam has at each end a sequence of holes extending along the beam, and each end beam portion has at its inboard end (the end that fits within the main beam) a single matching hole, then each end beam portion once positioned can conveniently be fixed in place by a securing pin inserted through the relevant aligned holes.

The dispenser of the invention is tractor-mountable, and on the beam assembly there is a three-point mounting—one upper mounting and two spaced lower mountings positioned symmetrically either side of the upper one—by which it can be attached to the tractor so as to extend laterally therebehind. In itself there is nothing particularly special about this mounting, which is such as might be found on any agricultural implement, and so it needs no further comment here. However, in order to enable the beam to be lifted well clear of the ground for when it is to be loaded with a fresh roll, and for carrying the roll to the place where it is to be laid, it may be desirable to have the bottom mountings be relatively low—that is, somewhat lower than would usually be the case for an agricultural implement to be mounted on a tractor this way.

The three-point mounting is conveniently roughly central of the beam assembly in its length direction, so that the roll it carries is similarly central of the tractor. It might, though, be desirable to offset the mounting, and thus the roll, to one side or another, so the expression "roughly central" can be interpreted quite widely. For example, the mounting might be 30 cm (a foot or so) to one side.

The beam assembly in the invention's dispenser has at either end a plate having rod-mounting means such that a support rod carrying the roll of material may be borne between the end plates. In the case where the beam is telescopic, then the plate is carried on the relevant smaller end beam portion. The plate is disposed generally normal to the beam (the exact angle is not especially relevant) and is of such a size and shape, and so positioned relative to the beam, that, with the roll on its support rod in place between the end plates, the roll is clear of the beam, and free to rotate on or with its rod as the material is dispensed therefrom. Although the term "plate" might imply a solid object, and in fact the plate preferably is a solid plate, it could itself be in the form of a framework.

The end plates have rod-mounting means such that the roll's support rod may be carried thereby. The rod mounting means might be a socket suitably positioned on the inside of the plate, and in which socket the very end of the rod is seatable, or it might be an aperture through the plate though which the rod is threaded, slightly projecting out at either end. This aperture could be associated with bearings, allowing the rod to turn within the aperture while the roll material is being dispensed, or it could simply be a hole; if the rod sticks in the hole, then the roll, being loosely mounted on the rod, will rotate around the rod. Most preferably, however, it is a deep, inverted, U-shaped notch in the bottom edge of the plate into which the rod can be slotted without the need for any threading action, and preferably the notch is associated with displaceable retaining means so that the rod, once in place, can be prevented from falling out until it is to be removed. A possible retaining means is a small apertured plate that slides over the rod ends and is then pinned or otherwise detachably attached to the main plate. Such a plate could include any bearings necessary to allow the rod to rotate when so mounted. However, a much preferred retaining means is a detent (or catch), conveniently a hook-like detent spring-biased shut but manually openable, to retain the rod within the notch. Using such a detent, in operation the dispenser is raised, the roll on its support rod is moved underneath to where the rod is aligned with the notches in the plates, and then the dispenser is lowered onto the rod, so that each rod end slips past the detent and into the notch, whereupon the detent springs back to hold the rod in place. To release the rod (when the roll is used up, say), the detent is simply pulled back, and the rod falls out.

It is preferable if such a hook-like detent be configured as a lever device, the free end of the lever being connected via suitable means—wires and pulleys, say, or pull/push rods, or even a hydraulic ram and appropriate controls—to a master control operable manually by the tractor driver.

As noted hereinbefore, it is a particularly preferred feature of the invention that the beam assembly be associated with positioning control means that can in operation be used to effect adjustment of the lateral angle of the lower linkages of the tractor's three-point mounting, and thus to move the roll to one side or the other to modify where, in use, the liner is laid. First, there is needed a driver device for effecting this movement, and conveniently such a device is a hydraulic ram taking the place of one of the movement-restriction chains usually employed with the arms, which ram is powered by the tractor's hydraulic system. Then there is needed a control arrangement—and preferably such an arrangement as can be utilized by an operator walking along just behind and to one side of the dispenser, and gauging by eye the accuracy with which the roll material is being laid. Advantageously, then, this control arrangement is a conventional lever-operated hydraulic switch operatively connected to the ram and mounted at the rear and side of the beam assembly—and one on each side is obviously desirable, so that the operator may be at whichever side is where there is being formed the overlapping seam of the liner being laid on that previously laid.

Conveniently, the dispenser of the invention is associated with some metering means whereby there may be determined what length of material has been dispensed from the roll, and thus how much is left. Such a meter can be driven directly from the rotation of the roll, much like a car or bicycle odometer is driven by rotation of the wheels or drive chain.

As so far described, the invention provides a dispenser for a single roll of material. There is no reason, however, why the dispenser should not handle two, or more, rolls at once, each roll being similarly mounted between the end plates. Indeed, for some purposes a two-roll dispenser might be ideal—for example, there might be distributed as the bottom layer (from one roll) a liner that is physically very strong but not necessarily impenetrable by water (or some other liquid), and this could, effectively simultaneously, be itself covered (from the second roll) by a layer of a less robust but totally liquid-blocking material—or, of course, vice versa.

As noted above, it is important, when laying a liner in a tip, reservoir or the like, not to mark the smooth surface of the underlying ground formation, and any undesirable marking can be avoided, or at least mitigated, by using a tracked vehicle or low flotation tires (preferably without tread). However, if despite this the surface is marked, it may be possible to smooth it out immediately prior to laying the liner by the simply expedient of mounting just behind the tractor, or on the dispenser but just ahead of the roll being laid, a roller that will take out or level any indentations.

BRIEF DESCRIPTION OF THE DRAWINGS

An embodiment of the invention is now described, though by way of illustration only, with reference to the accompanying diagrammatic drawings in which.

EMBODIMENTS OF THE INVENTION

Figure 1:
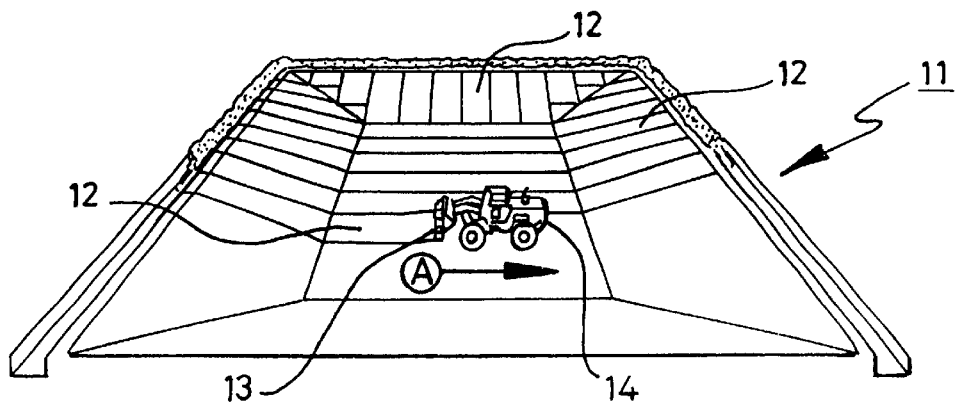
FIG. 1 shows a view of a cell—a hole to be filled—of a rubbish tip being lined in the known manner using a loading shovel.

FIG. 1 shows a view of a cell of a rubbish tip pit (generally 11) being lined in the known manner with the use of a loading shovel to carry the roll of lining material. It is not to scale—in reality the cell is much larger, and the loading shovel much smaller, but it serves to illustrate how the liner is laid in strips (as 12) pulled out from a roll 13 mounted on the front of a loading shovel 14. The loading shovel is moving backwards, in the direction of arrow A, paying out the strip as it goes, with the driver maneuvering as he proceeds in order to keep the strip straight and correctly overlapping the previously-laid adjacent strip.

Figure 2:
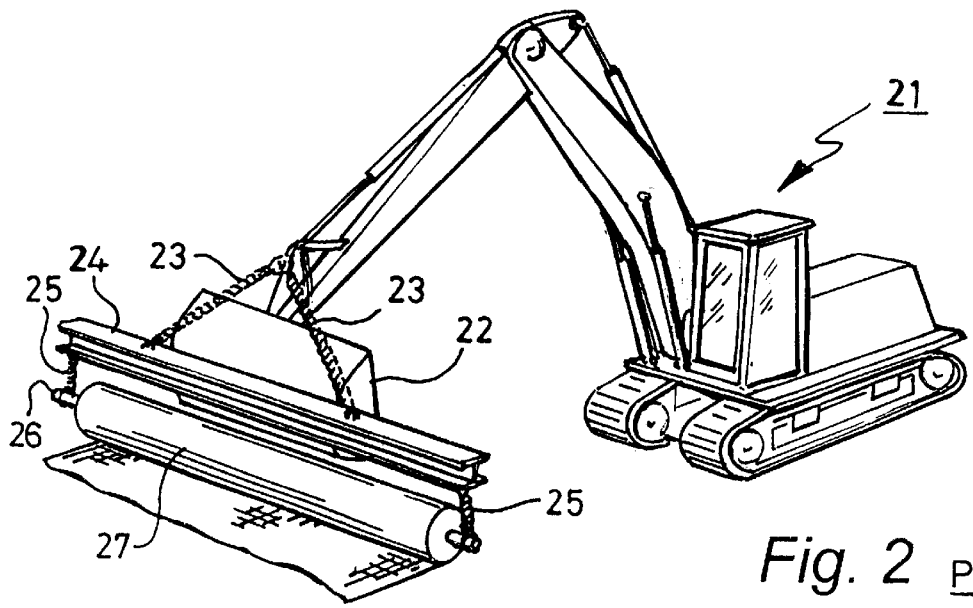
FIG. 2 shows a perspective view of a 360 excavator equipped to lay a liner in accordance with known techniques.

FIG. 2 shows a perspective view of an excavator (of the type referred to as a 360) equipped to lay a liner in accordance with known techniques. The excavator (generally 21) carries on its arm a conventional hydraulically-actuated bucket 22 from an eye on the mounting for which dangle chains 23 holding up a girder-like beam 24 to the ends of which are similarly attached (by chains and rings 25) a supporting rod 26 which is threaded through, and thus supports, a roll 27 of liner, which is in operation dispensed out as the excavator travels along.

Figure 3:
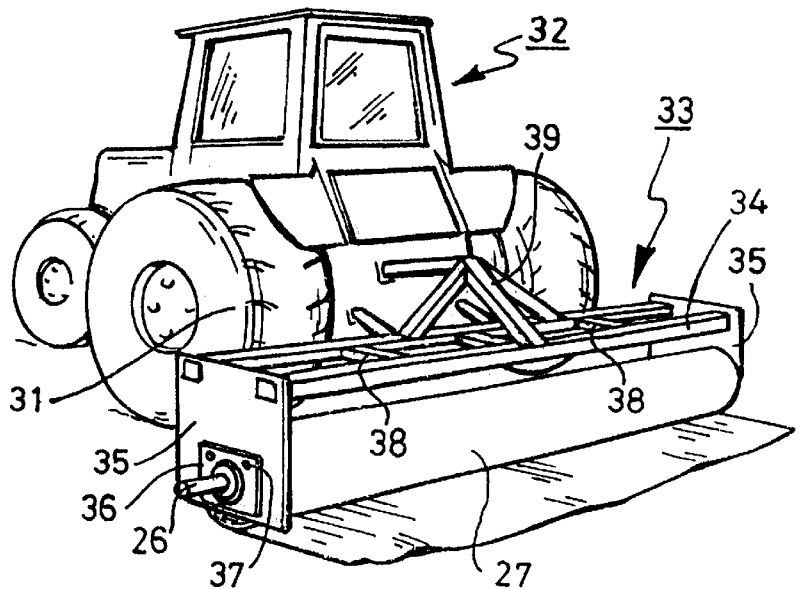
FIG. 3 shows a perspective view of a tractor equipped to lay a liner using a dispenser in accordance with the invention.

FIG. 3 shows a perspective view of a conventional tractor having a rear-mounted three-point implement mounting system and equipped to lay a liner using a dispenser in accordance with the invention. Fitted with balloon, or low flotation, tires 31 the tractor (generally 32) carries on its rear mounting a framework dispenser (generally 33) of the invention. The framework has two square-section main beams 34 extending laterally across the full width of the tractor 32 (and tires 31) and beyond, and at each end of the beams is a normally-disposed end plate 35 to which the beams 34 are welded. Centrally of each end plate 35, but nearer the (as viewed) bottom edge thereof, is an inverted U-shaped slot (not shown in this Figure) through which passes the rod 26 supporting a roll 27 of liner. The rod 26 is retained in the slot by an apertured end capping plate 36 which is affixed by nuts/bolts 37 to the end plate 35 and through the aperture of which passes the rod 26.

The framework of beams 34 is cross-braced by struts 38, and has three-point mounting struts 39 forming the mounting points by which it is attached to the tractor's three-point mounting system.

Figure 4:
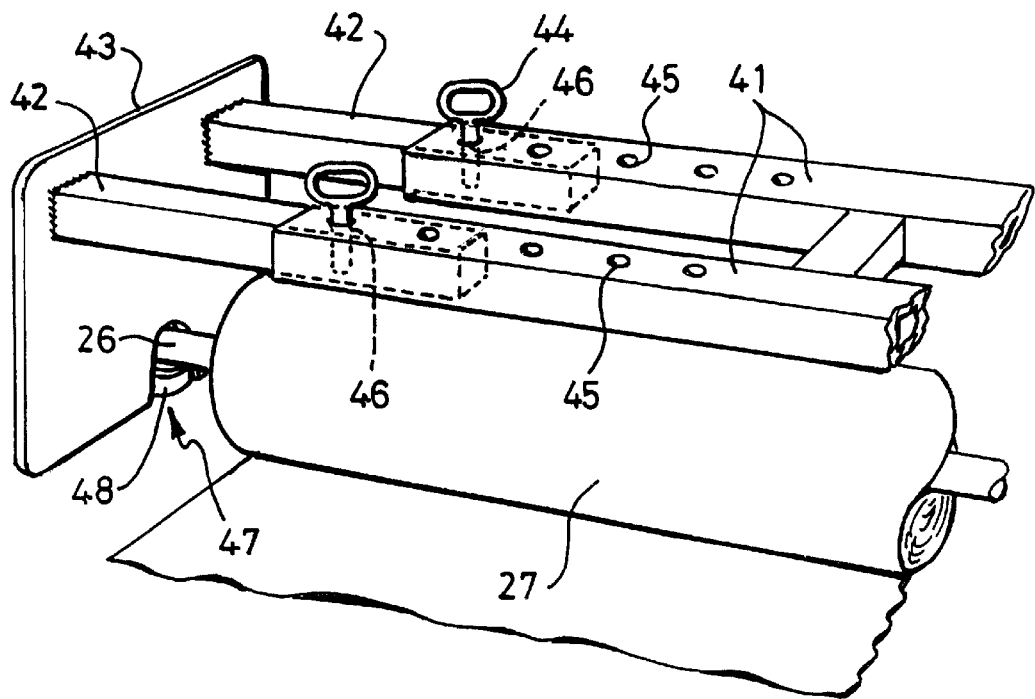
FIG. 4 shows a perspective view of one end of a dispenser of the invention, and similar to that shown in FIG. 3.

FIG. 4 shows a perspective view of one end of a dispenser of the invention, and similar to but not the same as that shown in FIG. 3. Other views of this are shown in FIGS. 5, 6 and 7.

Figure 5:
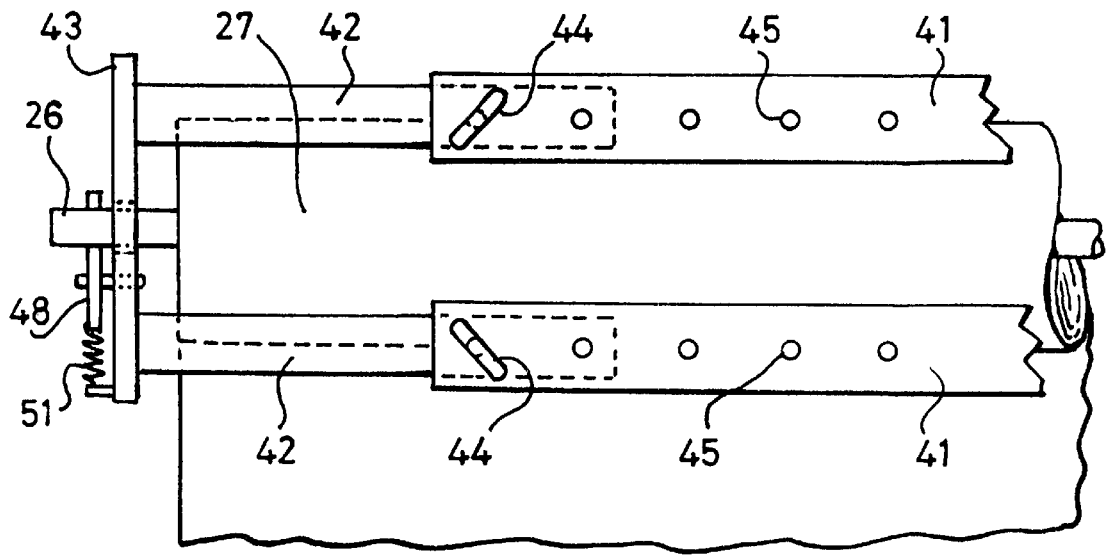
FIG. 5 shows a top plan view of the dispenser shown in FIG. 4.

In FIG. 4 can clearly be seen the use of hollow square-section telescopic beams—two fore and aft main beams 41 each ending at each end (though only one end is shown in FIGS. 4 and 5) in a smaller beam portion 42 mounted slidably within the main beam 41. The end plate 43 is welded to the "free" ends of the smaller beam portions 42, and its position relative to the main beams 41—and thus to the similar end plate (not shown) welded at the "free" end of the small beam portions other end of the main beams 41 (not shown)—may be adjusted by sliding the smaller bean portions in, or out (as appropriate) and then locking them in place with the hand pins 44 passing through mating holes (as 45, 46) in the main bean 41 and in the small beam portions 42.

As in the FIG. 3 embodiment, here too the roll 27 is supported on a rod 26 that is slotted into an inverted U-shaped slot 47 in the bottom edge of each end plate 43. However, instead of an apertured capping plate 36 (as in FIG. 3), there is a hook-shaped pivoted detent (48: best seen in FIG. 7) that is biased closed by a spring (51: not shown in FIG. 4) to retain the rod 27 in place in the slot 47. The detent 48 can be drawn back, to release the rod 26, by a system of wires 71 and pulleys shown, in part, only in FIG. 7).

Figure 6:
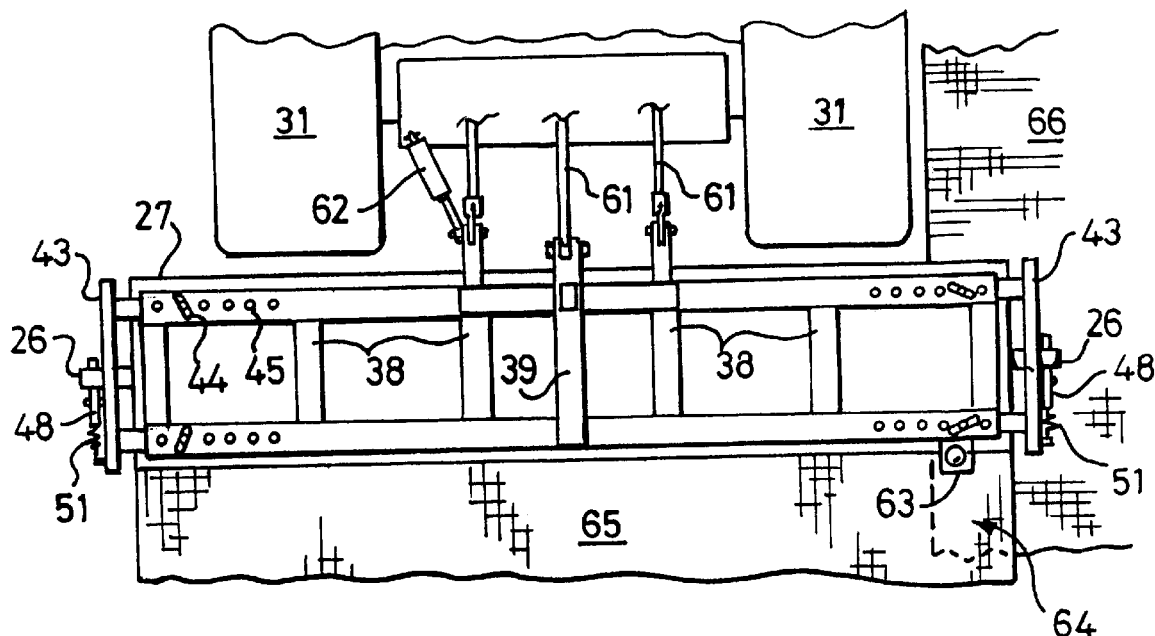
FIG. 6 shows a top plan view of the whole of the dispenser of FIG. 4, attached to a tractor.
Figure 7:
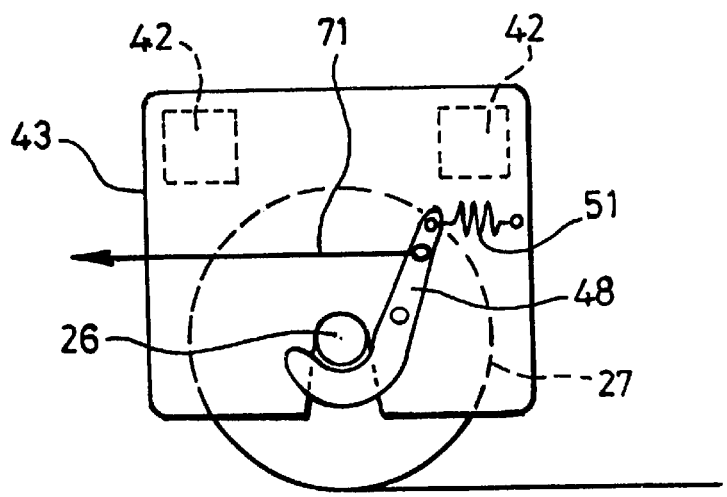
FIG. 7 shows an end/side view of the dispenser of FIG. 4.

A top plan view of the whole of the dispenser of FIG. 4, attached to a tractor, is shown in FIG. 6, while FIG. 7 shows a view of an end/side—the left side, as seen in FIG. 6—of the dispenser.

From FIG. 6 can be seen the three-point linkage (61: one upper, two lower rigid connections) to the tractor's three-point mounting, together with a hydraulic ram 62 mounted between the tractor and one of the link arms 61 and operated by a control stick 63 mounted to the rear and inboard of the right-hand (as viewed) end plate 43. This enables an operator walking along behind and to the right of the dispenser to "steer" the dispenser, so as to adjust the overlap 64 of the liner 65 being laid on top of the previously-laid liner 66. If the ram pushes out, the dispenser is moved slightly to the right (as viewed); if it pulls in, the adjusting movement is to the left.

What is claimed and desired to be protected by Letters Patent is:

1. A tractor-mountable dispenser for a roll of material, the dispenser comprising:
   an elongate beam assembly comprising at least one beam and having centrally thereof a three-point mounting by which it is adapted to be attached to a tractor so as to extend laterally therebehind,
   a pair of end plates mounted at each end of said beam assembly, said end plates being constructed such that cooperatively they provide a mounting for a support rod for the roll of material, and
   positioning control means, operatively associated with said beam assembly, that is constructed so as to be able to effect adjustment of the lateral angle of lower linkages of a tractor's three-point mounting, and thus to move the roll of material to be dispensed to one side or the other to modify where, in use, the dispensed material is laid.

2. A dispenser as claimed in claim 1, wherein said beam assembly comprises a box-like framework of beams, wherein the end plates form a pair of opposed faces at each side of the box-like framework, and wherein the top surface of the box-like framework is defined by a pair of spaced parallel beams having suitable length to separate said end plates a distance appropriate for the width of the roll of material selected for dispensing.

3. A dispenser as claimed in claim 1, wherein said beam assembly is telescopic, whereby the length of any beam is adjustable so that it can more easily and efficiently cater for rolls of varying width.

4. A dispenser as claimed in claim 3, wherein the beam assembly comprises a hollow, tubular main beam having slidably mounted therewithin at each end a short end beam portion adapted to be moved inwardly and outwardly of the main beam and then fixed in place, so as to alter the overall length of the beam assembly.

5. A dispenser as claimed in claim 4, wherein the main beam has at each end a sequence of holes extending along the main beam, and each end beam portion has at its inboard end a single matching hole, such that each end beam portion once positioned can be fixed in place by a securing pin inserted through the relevant aligned holes.

6. A dispenser as claimed in claim 1, wherein the beam assembly is adapted to be mounted relatively low on a tractor, whereby any beam is enabled to be lifted well clear of the ground.

7. A dispenser as claimed in claim 1, wherein each end plate is constructed to provide a deep, inverted, U-shaped notch in the bottom edge thereof, into which the support rod can be slotted without the need for any threading action.

8. A dispenser as claimed in claim 7, wherein each of said notches is associated with displaceable retaining means so that the rod, once in place, can be prevented from falling out until it is to be removed.

9. A dispenser as claimed in claim 8, wherein the retaining means is a hook-like detent, spring-biased shut but manually openable, and configured as a lever device, the free end of the lever being connected to a master control adapted to be operable manually by a tractor driver.

10. A dispenser as claimed in claim 1, wherein said 3-point mounting of the beam assembly comprises a lower arm, and wherein the positioning control means includes a hydraulic ram to move laterally said lower arm of the 3-point mounting of the beam assembly, and further includes a controlling lever-operated hydraulic switch operatively connected to the ram and mounted at the rear and side of the beam assembly.

* * * * *